United States Patent [19]
Ohkumo et al.

[11] Patent Number: 4,823,925
[45] Date of Patent: Apr. 25, 1989

[54] CONTROL SYSTEM FOR A CLUTCH FOR A VEHICLE

[75] Inventors: Hiroya Ohkumo, Koganei; Ryuzo Sakakiyama, Tokyo, both of Japan

[73] Assignee: Fuji Jukogyo Kabushiki Kaisha, Tokyo, Japan

[21] Appl. No.: 40,402

[22] Filed: Apr. 20, 1987

[30] Foreign Application Priority Data

Apr. 24, 1986 [JP] Japan .................................. 61-096464

[51] Int. Cl.$^4$ ........................ B60K 41/02; F16D 37/02
[52] U.S. Cl. ............................. 192/0.076; 192/0.07; 192/0.096; 192/21.5
[58] Field of Search ................. 192/0.032, 0.034, 0.07, 192/0.075, 0.076, 0.096, 21.5, 103 R

[56] References Cited

U.S. PATENT DOCUMENTS

| | | | |
|---|---|---|---|
| 2,735,643 | 2/1956 | Reppert et al. | 261/DIG. 18 |
| 3,132,728 | 5/1964 | Chaptois | 192/0.075 |
| 4,662,496 | 5/1987 | Sakakiyama | 192/0.076 |
| 4,680,711 | 7/1987 | Miyawaki | 192/0.076 |

FOREIGN PATENT DOCUMENTS

| | | | |
|---|---|---|---|
| 151038 | 8/1985 | European Pat. Off. | |
| 77536 | 4/1986 | Japan | 192/0.096 |

Primary Examiner—Rodney H. Bonck
Assistant Examiner—David A. Testardi
Attorney, Agent, or Firm—Martin A. Farber

[57] ABSTRACT

A system for controlling clutch current of an electromagnetic clutch at release of an accelerator pedal of a vehicle in a low vehicle speed range. The clutch is disengaged when the accelerator pedal is released in the low vehicle speed range. The disengagement of the clutch and reduction of an engine are delayed so s to prevent oscillaiton of the speed of a power transmission system.

11 Claims, 10 Drawing Sheets

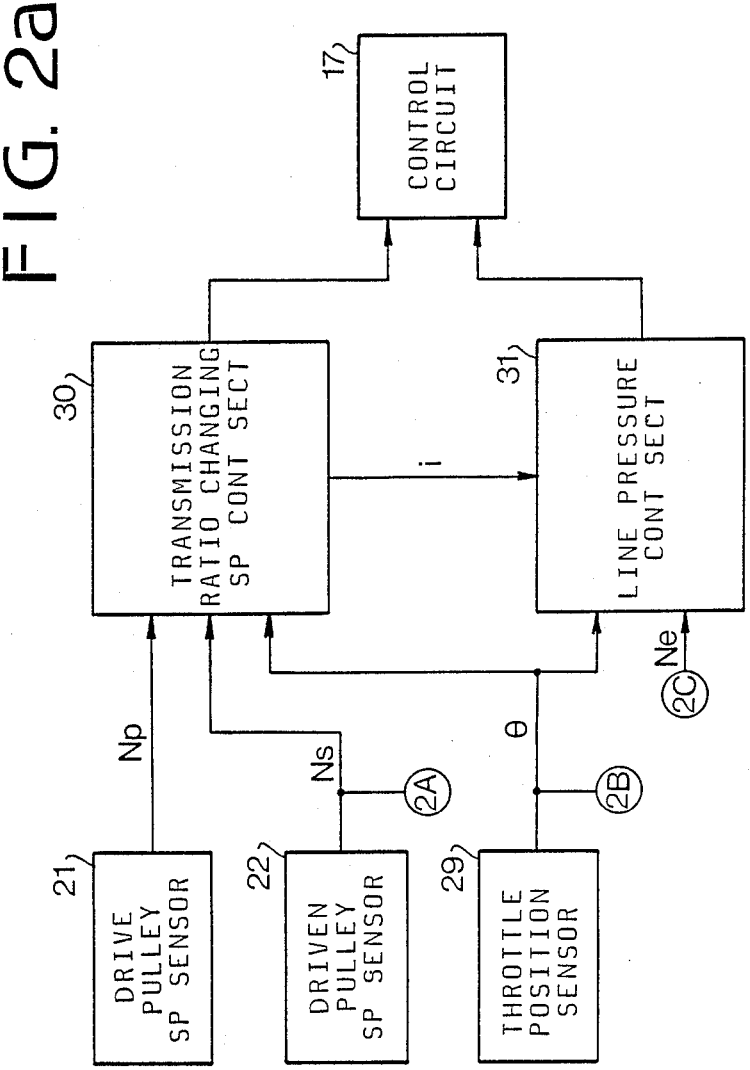

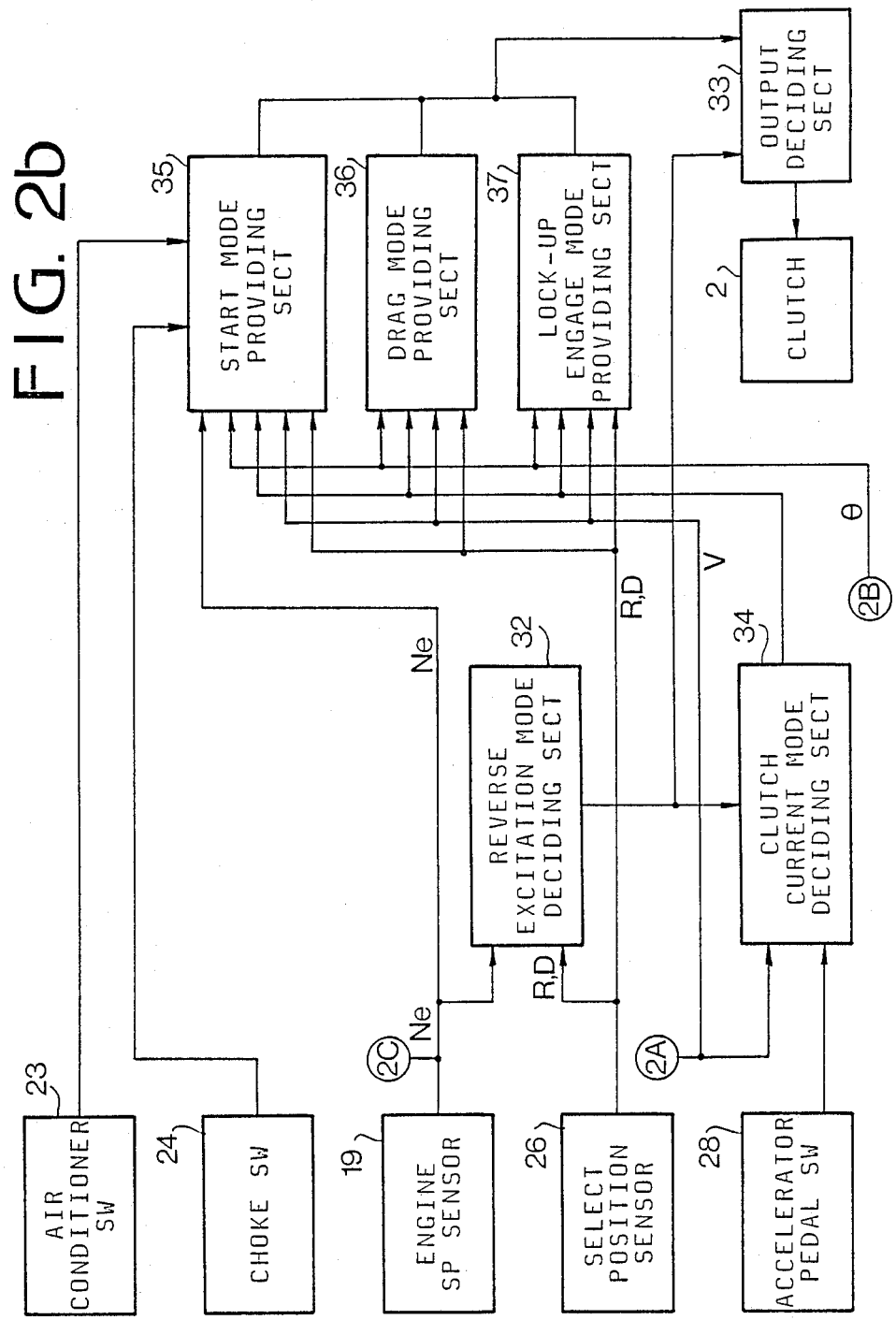

CONTROL SYSTEM FOR A CLUTCH FOR A VEHICLE

BACKGROUND OF THE INVENTION

The present invention relates to a control system for an electromagnetic clutch for an automatic transmission of a motor vehicle.

An automobile provided with a continuously variable belt-drive transmission with an electromagnetic clutch is disclosed in EP-A No. 151038. The electromagnetic clutch of the transmission is controlled by a control system to provide various operational modes for clutch torque (clutch current). One of the modes is selected in accordance with a position of a selector lever and driving conditions of the vehicle to control the electromagnetic clutch.

The operational modes include a start mode and a drag mode decided in accordance with operations of an accelerator pedal at a vehicle speed lower than a predetermined speed. In the start mode of the vehicle, the clutch current is increased in proportion to the engine speed or the opening degree of a throttle valve of the engine for smoothly engaging the clutch. In the drag mode, the clutch current is reduced to zero or a small current to disengage the clutch or to provide a drag torque.

More particularly, when the accelerator pedal is released in a low vehicle speed range after starting the vehicle to close a throttle valve (FIG. 7a), the mode of the clutch current is immediately changed to the drag mode. Thus, as shown in FIG. 7b, the clutch current becomes zero or is changed to a drag current id to disengage the clutch. The engine speed Ne gradually decreases, while speed No of an output shaft of the clutch begins to oscillate as shown in FIG. 7c. The reason for the oscillation is as follows.

At a start of the vehicle, driving torque is applied to the drive power transmission system of the vehicle. When the accelerator pedal is released, the driving torque is exerted on the system in the reverse direction. At this time, the clutch is disengaged, so that the system is cut off, which causes the oscillation of the system. The oscillation causes the vehicle to stumble, which is transmitted to the driver Therefore, the driveability at coasting in a low vehicle speed range is not good.

Particularly, in an automobile with a continuously variable belt-drive transmission, since a pulley device has a large mass of inertia, such a stumbling may easily occur.

SUMMARY OF THE INVENTION

The object of the present invention is to provide a control system which may improve the driving characteristic at the release of the accelerator pedal in a low vehicle speed range.

The other objects and features of this invention will become understood from the following description with reference to the accompanying drawings.

BRIEF DESCRIPTION OF DRAWINGS

FIGS. 2a and 2b together show a block diagram of a control unit according to the present invention;

DETAILED DESCRIPTION OF THE PREFERRED EMBODIMENT

Figure 1:
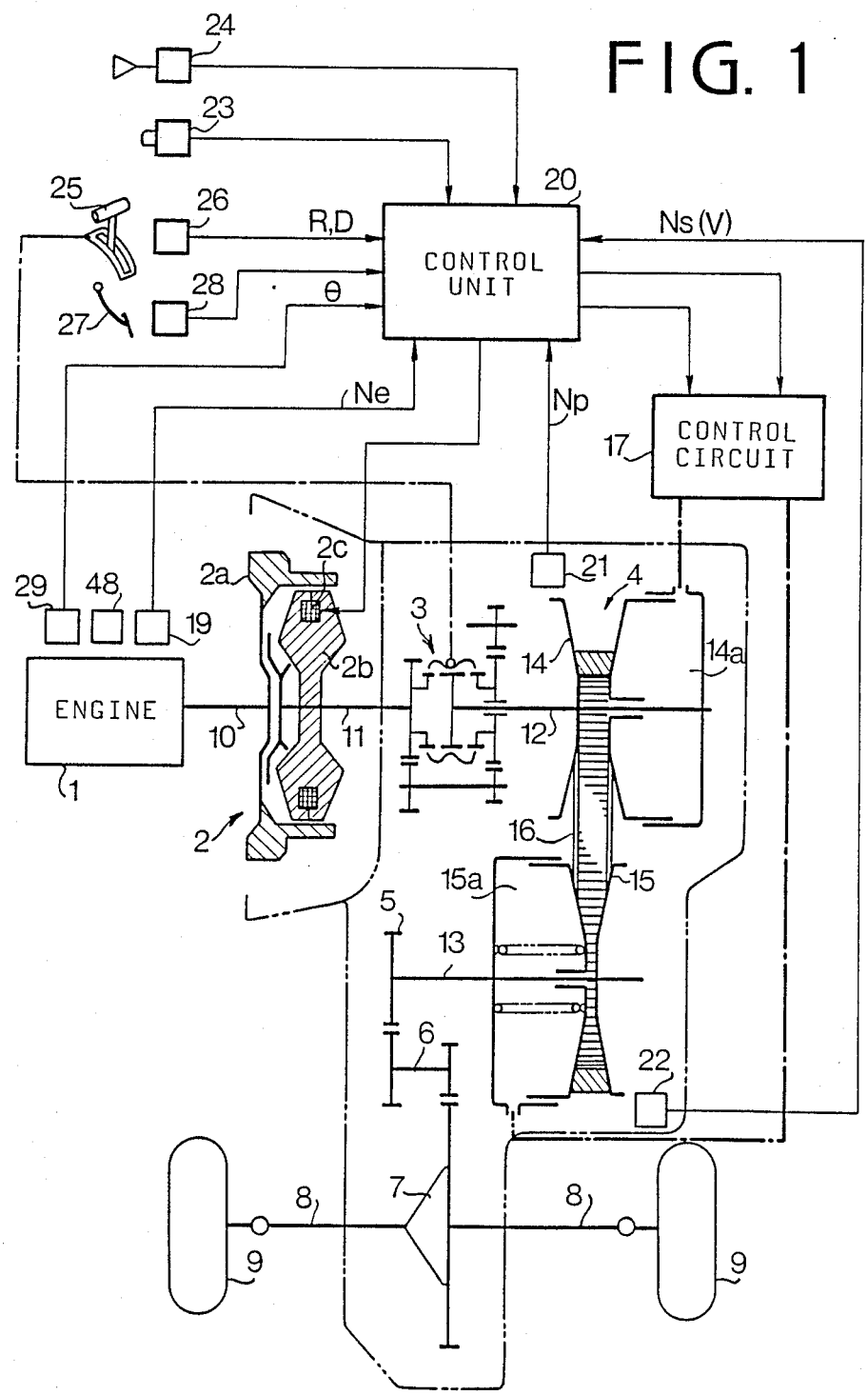
FIG. 1 is a schematic illustration of a control system for an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive automatic transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces of the cylinders so that the running diameter of belt 16 is varied to infinitely change the transmission ratio.

An electronic control system for the clutch 2 and the belt-drive automatic transmission 4 has an engine speed sensor 19, and rotating speed sensors 21 and 22 for respectively sensing speeds of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal for the clutch 2 and a control signal for controlling the transmission ratio (i) and a line pressure control signal for the control circuit 17.

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a desired transmission ratio changing speed (rate) $di/dt$. A line pressure control section 31 is applied with an engine speed signal Ne of the sensor, 19, throttle position signal $\theta$ of the sensor 29, and an actual transmission speed ratio signal i ($N_S/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at ordinary start or at closing of the choke switch 24 or air conditioner switch 23. The starting characteristic is corrected by signals from the throttle valve opening degree $\theta$, vehicle speed V, and driving positions of D-range and R-range.

The drag mode providing section 36 decides a small drag current when the accelerator pedal 27 is released at a low speed in each drive position for providing a drag torque to the clutch 2 for the smooth start of the vehicle.

Figure 3:
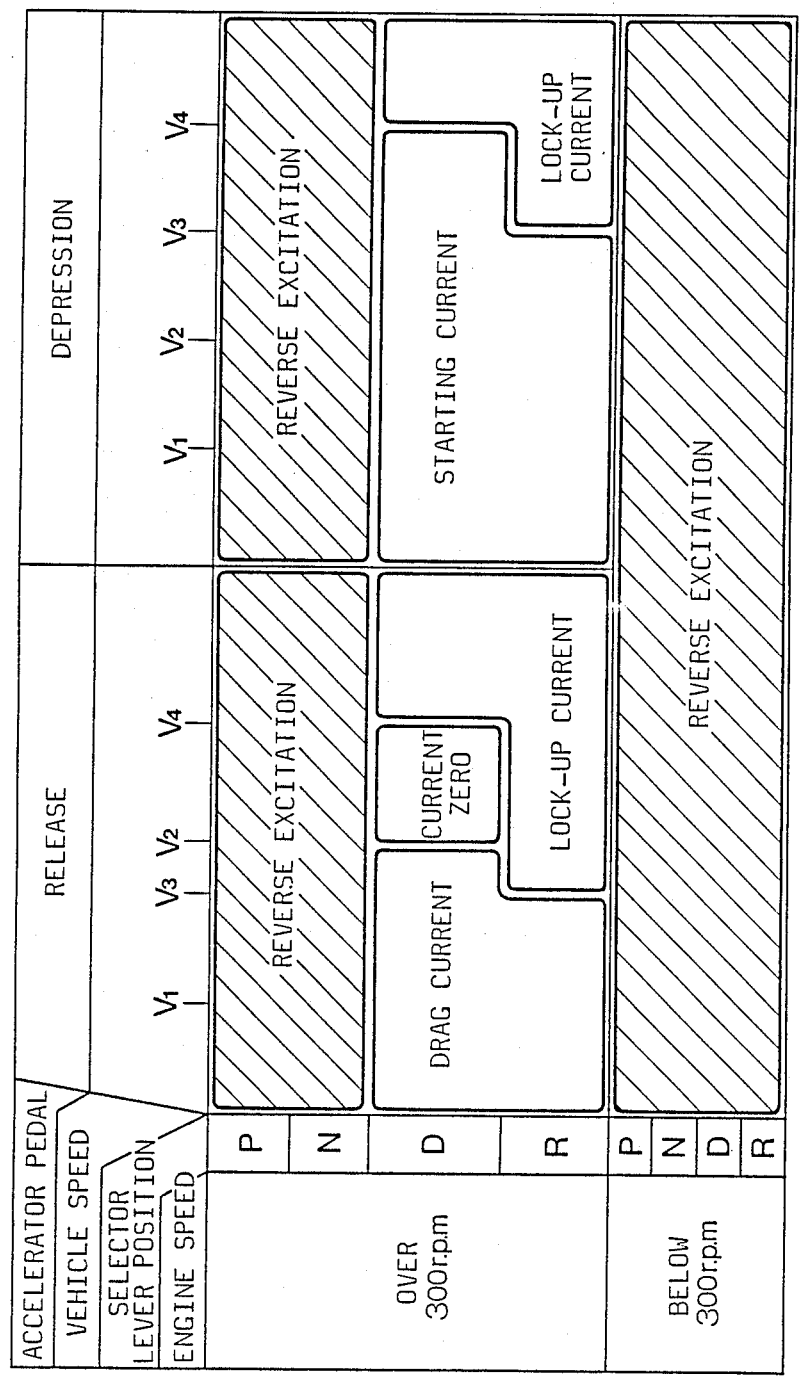
FIG. 3 is a graph showing regions of various modes.

The clutch lock-up engage mode providing section 37 decides a lock-up current in response to the vehicle speed V and throttle valve opening degree $\theta$ at each drive position for entirely engaging the clutch 2. Outputs of sections 35, 36 and 37 are applied to the output deciding section 33 to control the clutch current. A range of each mode is shown in FIG. 3.

Figure 4A:
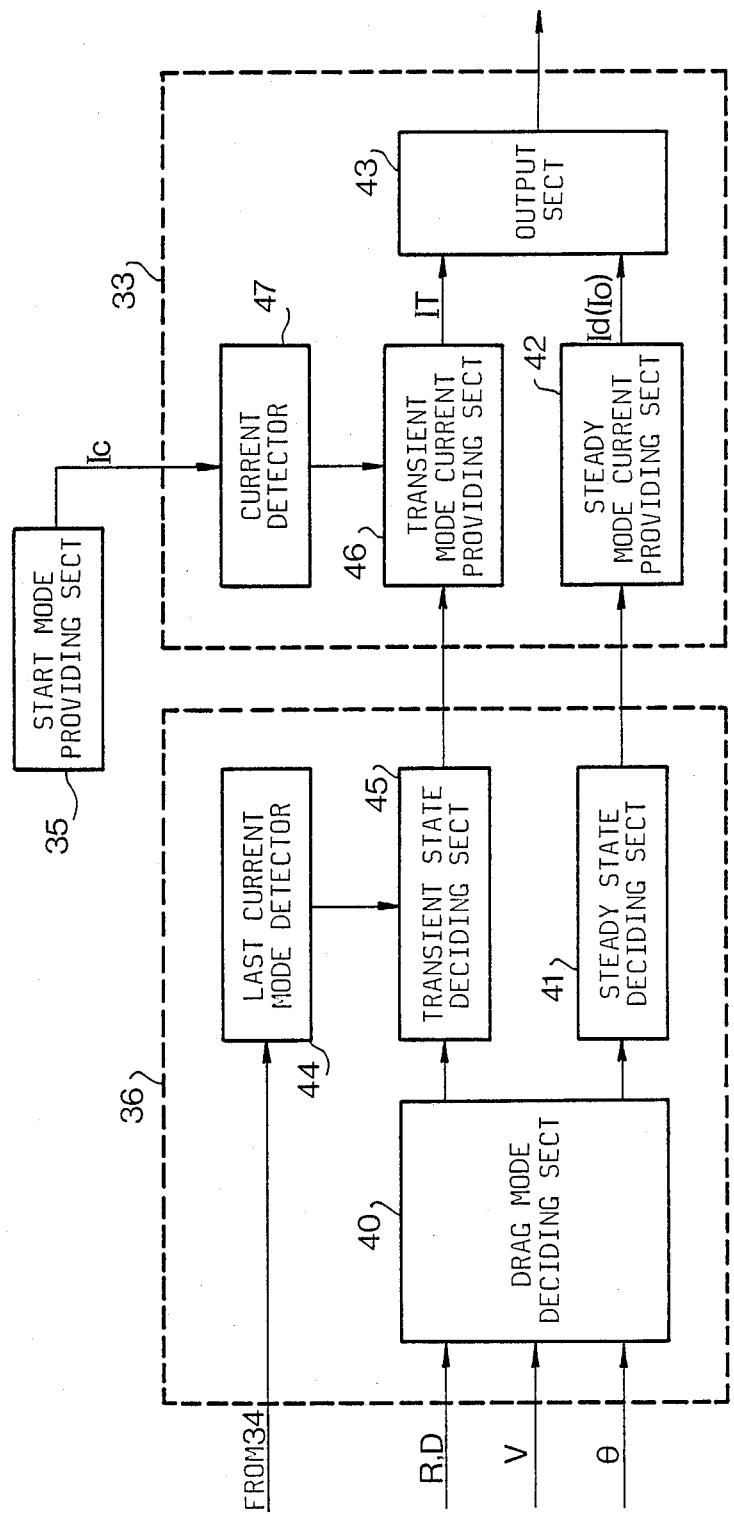
FIG. 4a is a block diagram of a main part of the system according to the invention.

Referring to FIG. 4a, the drag mode providing section 36 is provided with a drag mode deciding section 40 applied with output signals of throttle valve opening degree $\theta$, vehicle speed V, select positions of R-range and D-range. In accordance with input signals, the drag mode deciding section 40 produces output signals which are fed to a steady state deciding section 41 and a transient state deciding section 45, respectively. The steady state deciding section 41 decides the steady state of driving condition, and produces a steady state signal. A last current mode detector 44 is applied with a signal from the clutch current mode deciding section 34 and detects whether a mode of the clutch current at the last program is a start mode or not. The resultant signal is applied to the transient state deciding section 45 which produces a transient state signal.

In the output deciding section 33, a steady mode current providing section 42 produces a zero current signal Io or a drag current signal Id in response to the steady state signal from the steady state deciding section 41. A transient mode current providing section 46 is applied with the transient state signal from the transient state deciding section 45 and produces a transient mode signal IT. A current detector 47 is applied with an output signal of the start mode providing section 35 and detects a clutch current Ic just before the release of the accelerator pedal. The detector 47 further operates to compare the clutch current Ic with a predetermined current IR.

Figure 4B:
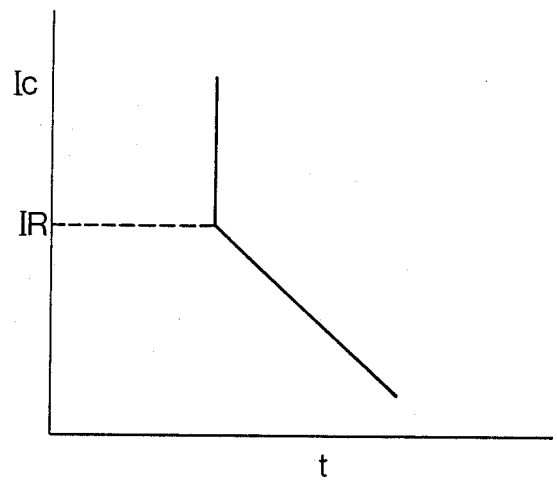
FIGS. 4b and 4c are graphs showing variations of clutch current.

As shown in FIG. 4b, when the clutch current Ic is above the predetermined current IR (Ic>IR), the clutch current Ic is decreased to the predetermined current IR, and then gradually decreased therefrom to the drag current at a decreasing rate $dI/dt$. On the other hand, when the clutch current Ic is below or equal to the predetermined current IR (Ic≦IR), the clutch current Ic is gradually decreased at the decreasing rate $dI/dt$.

Figure 4C:
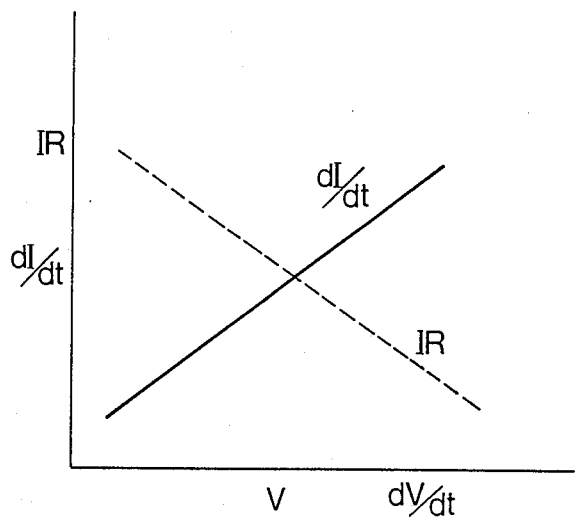

It is preferable to vary the set current IR and the decreasing rate $dI/dt$ in accordance with driving conditions. FIG. 4c shows the variations. The set current IR decreases with increase of vehicle speed V or vehicle deceleration $-dv/dt$, and the decreasing rate $dI/dt$ increases with increase of the vehicle speed V or the deceleration $-dv/dt$. Further, the variations can be made in accordance with operation of the air conditioner.

On the other hand, since the decrease of the clutch current Ic to the drag current delays, the clutch is held in partial engagement for a period. Accordingly, the load on the engine becomes larger than the output of the engine, which will cause the stall of the engine.

In order to absorb the load on the engine and to prevent the stall of the engine, a dashpot 48 (FIG. 1) is provided for the throttle valve to slow throttle closing to keep an engine speed for a period.

Describing the operation of the system with reference to

FIGS. 5a and 6a to 6c, when the selector lever is shifted to the drive position (D-range) at a time t1, the mode of the clutch current is changed to the drag mode. The drag mode is decided at the drag mode deciding section 40 of the drag mode providing section 36. In this state, a last mode is a reverse excitation mode, so that the steady mode is decided for determining a drag current Id at the steady mode current providing section 42. The drag current Id is applied to the clutch 2 through an output section 43.

When the accelerator pedal is depressed at a time t2, the drag mode is changed to the start mode, so that the clutch current Ic flows from the start mode providing section 35 for starting the vehicle and increases in proportion to the engine speed Ne. Thus, the vehicle is started.

When the accelerator pedal is released at a time t3 in the low vehicle speed range before the vehicle speed reaches V3 or V4, the mode of the clutch current is changed to the drag mode by the decision at the drag mode deciding section 40. In the state, the last mode detector 44 detects that the last mode is the start mode. Thus, the transient current mode in the drag mode is decided. When the start mode current detector 47 detects that the clutch current Ic is above the predetermined current IR (Ic>IR), the transient mode current providing section 46 sets the transient mode current IT to the current IR, so that the clutch current is decreased to the current IR.

Figure 5A:
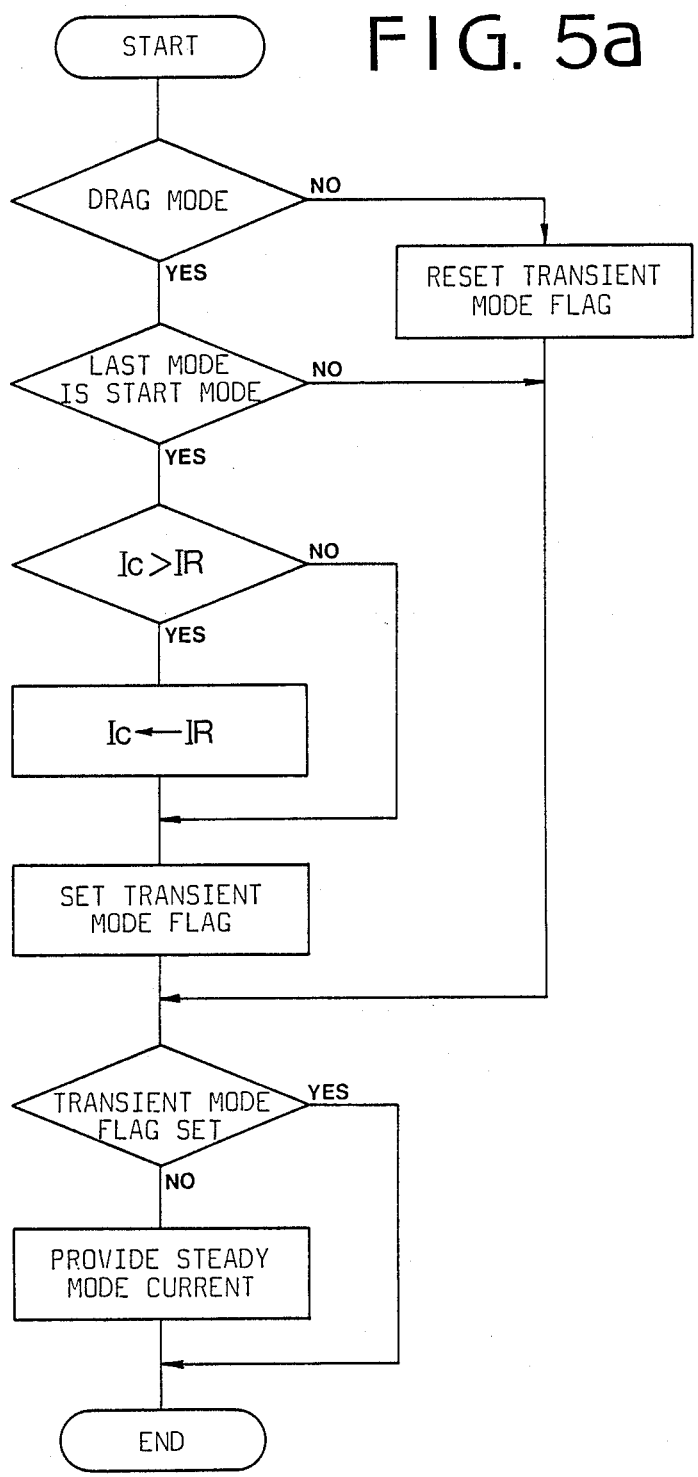
FIGS. 5a and 5b are flow charts showing the operation of the system.
Figure 5B:
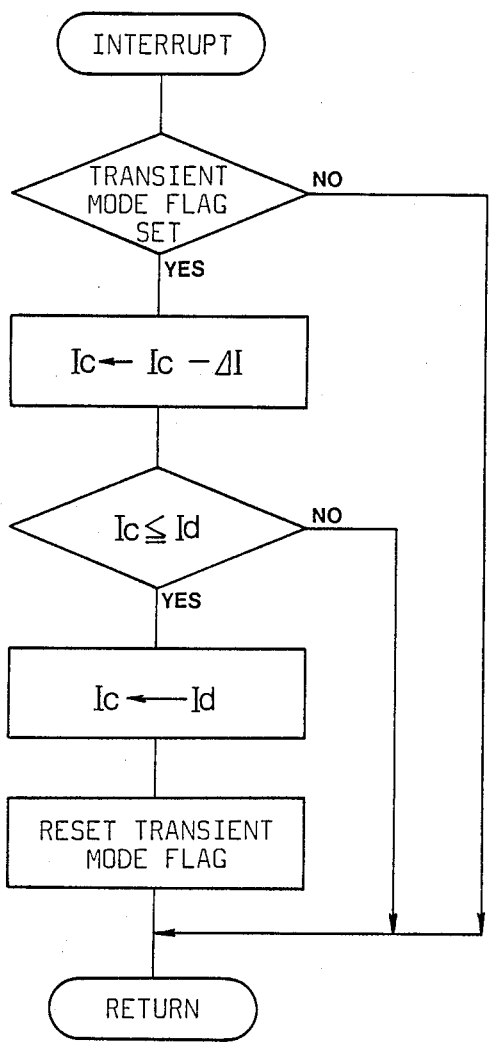

FIG. 5b shows an interrupt routine at the transient mode. When a flag of the transient mode is set, the clutch current Ic is reduced by ΔI to slowly decrease the clutch current.

In the drag current range shown in FIG. 3, the above-mentioned program continues until the clutch current reaches the drag current Id at a time t4. Then the flag is reset to end the program.

Accordingly, the clutch is not entirely disengaged, but maintained in partial engagement. On the other hand the engine speed Ne is kept higher than the idling speed by the dashpot 48 in synchronism with the operation of the system. Thus, the engine operation absorbs the reverse torque (load on the engine) so that the speed No of the output shaft of the clutch is prevented from a rapid decrease and oscillation thereof, as shown in FIG. 6c.

Figure 6A:
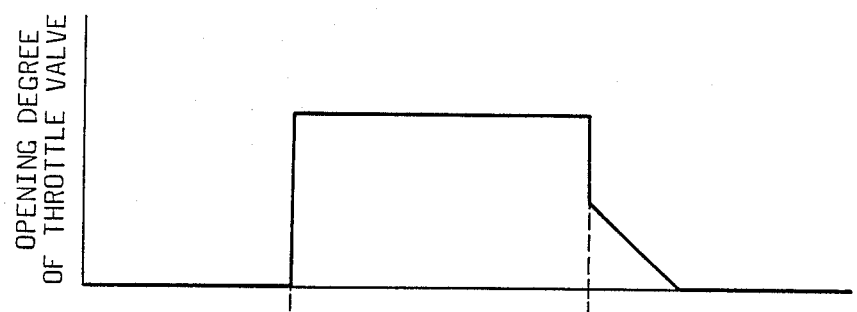
FIGS. 6a to 6c are graphs showing clutch current characteristics.
Figure 6B:
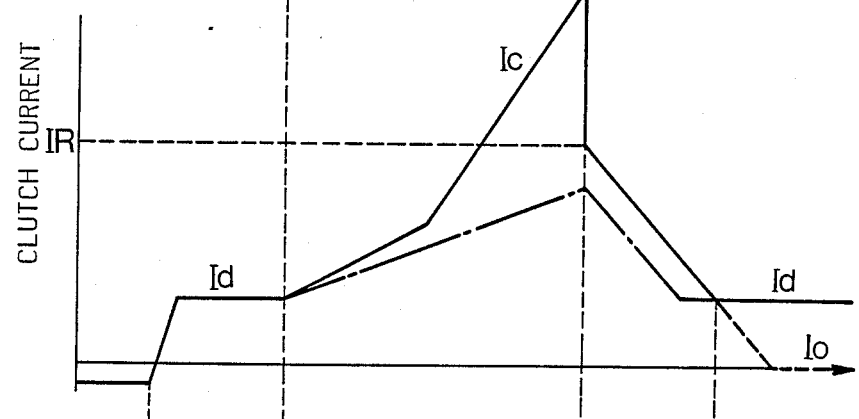
Figure 6C:
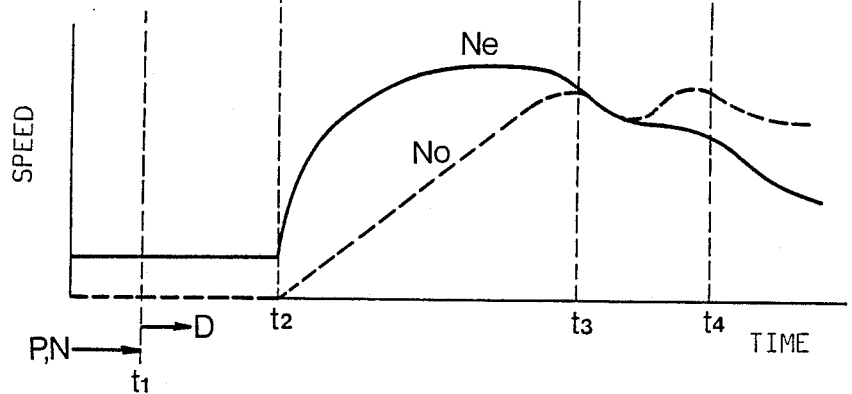
Figure 7A:
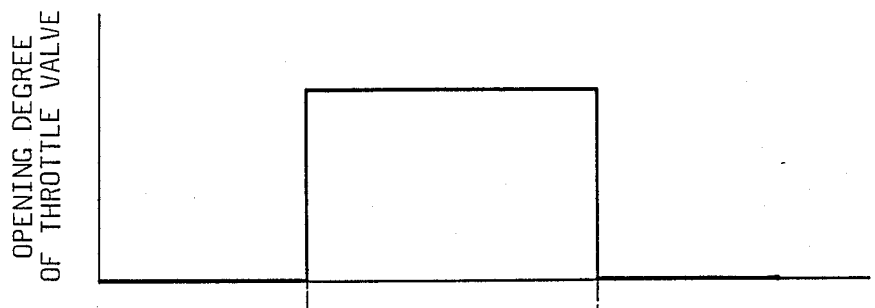
FIGS. 7a to 7c are graphs showing throttle valve opening degree, clutch current characteristics, and speeds of a conventional system.
Figure 7B:
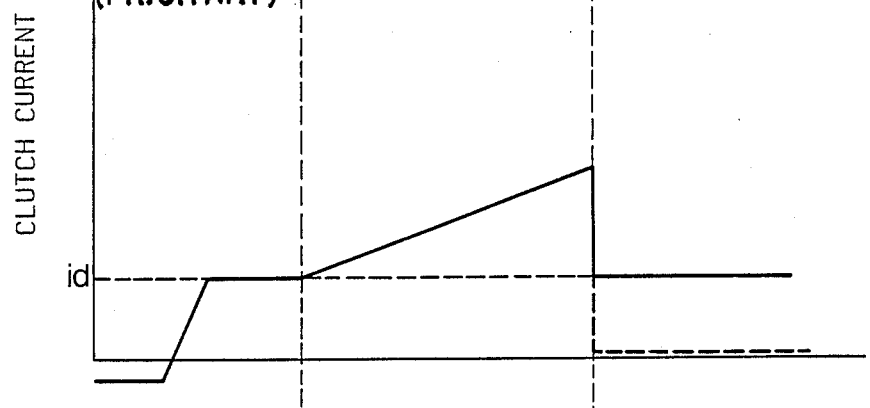
Figure 7C:
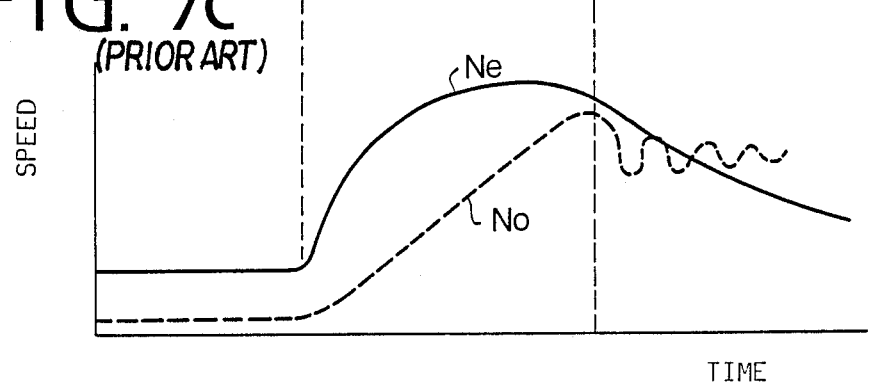

In the current zero range, the clutch current Ic is reduced to zero Io as shown by a dotted line of FIG. 6b. When the clutch current Ic is below or equal to the predetermined current IR (Ic≦IR), the clutch current is gradually reduced as shown by a chain line of FIG. 6b.

In accordance with the present invention, the control system controls to delay the decreases of the engine speed and clutch torque at the release of the accelerator pedal in the low vehicle speed range. Thus, preferable driving characteristics can be provided.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In control system for controlling and electromagnetic clutch for a motor vehicle having an engine with a throttle valve operatively connected to an accelerator pedal, a transmission operatively transmitting the power of the engine to wheel through a power transmitting path, sensing means for sensing operating conditions of the engine and transmission and for producing condition signals dependent on the operating conditions, start mode providing means for providing a start mode and for producing a start clutch current at depression of the accelerator pedal, drag mode providing means responsive to release of the accelerator pedal for providing a drag mode and for producing a drag clutch current to produce a drag troque on the electromagnetic clutch, and mode deciding means for deciding one of the modes responsive to the condition signals, the improvement in the control system comprising;

transient state deciding means for deciding a transient state responsive to an output signal of the more deciding means at the release of the accelerator pedal for producing a transient signal, clutch current detecting means responsive to an output signal of the start mode providing means for detecting clutch current just before the release of the accelerator pedal, clutch current control means responsive to an output signal of the clutch current detecting means for quickly reducing the clutch current to a first predetermined value and thereafter gradually reducing the clutch current to a second predetermined value lower than the first predetermined value to disengage the clutch, and engine speed control means gradually reducing the speed of the engine upon the release of the accelerator pedal, so as to prevent oscillation of the power transmitting path.

2. The control system according to claim 1 wherein said engine speed control means comprises a dashpot of the engine.

3. The control system according to claim 1 wherein the transmission is a continuously variable belt-drive transmission.

4. The control system according to claim 1, wherein the clutch is powder clutch.

5. The control system according to claim 1, wherein said first predetermined value varies in accordance with vehicle conditions.

6. The control system according to claim 5, wherein said first predetermined value decreases with increasing vehicle speed.

7. The control system according to claim 5, wherein said first predetermined value decreases with increasing vehicle deceleration.

8. The control system according to claim 1, wherein a decreasing rate of gradually reducing the clutch current to the second predetermined value varies in accordance with vehicle conditions.

9. The control system according to claim 8, wherein the decreasing rate increases with increasing vehicle speed.

10. The control system according to claim 8, wherein the decreasing rate increases with increasing vehicle deceleration.

11. The control system according to claim 1, wherein said engine speed control means keeps engine speed higher that idling speed upon the release of the accelerator pedal.

* * * * *